United States Patent
Okamura et al.

(10) Patent No.: US 12,528,343 B2
(45) Date of Patent: Jan. 20, 2026

(54) BONDING SHEET MATERIAL FOR WEATHER STRIP, WEATHER STRIP, AND METHOD FOR PRODUCING SAME

(71) Applicant: TOKAI KOGYO CO., LTD., Obu (JP)

(72) Inventors: Satoshi Okamura, Obu (JP); Yasuhiro Fukushima, Obu (JP)

(73) Assignee: TOKAI KOGYO CO., LTD., Obu (JP)

( * ) Notice: Subject to any disclaimer, the term of this patent is extended or adjusted under 35 U.S.C. 154(b) by 562 days.

(21) Appl. No.: 17/925,053

(22) PCT Filed: May 13, 2021

(86) PCT No.: PCT/JP2021/018241
§ 371 (c)(1),
(2) Date: Nov. 14, 2022

(87) PCT Pub. No.: WO2021/230322
PCT Pub. Date: Nov. 18, 2021

(65) Prior Publication Data
US 2023/0278406 A1     Sep. 7, 2023

(30) Foreign Application Priority Data

May 15, 2020  (JP) ................. 2020-086087

(51) Int. Cl.
*B60J 10/18*  (2016.01)
*B29C 43/02*  (2006.01)
(Continued)

(52) U.S. Cl.
CPC ............. *B60J 10/18* (2016.02); *B29C 43/021* (2013.01); *B60J 10/21* (2016.02); *B60J 10/84* (2016.02)

(58) Field of Classification Search
CPC .. B60J 10/18; B60J 10/21; B60J 10/84; B29C 43/021
See application file for complete search history.

(56) References Cited

U.S. PATENT DOCUMENTS

| 4,771,093 A | 9/1988 | Nakane et al. |
| 6,395,371 B1 * | 5/2002 | Nozaki .................... B60J 10/82 428/305.5 |

(Continued)

FOREIGN PATENT DOCUMENTS

| CN | 1730307 A | 2/2006 |
| CN | 101203565 A | 6/2008 |

(Continued)

OTHER PUBLICATIONS

SANTOPREME Materials Datasheet (Year: 2024).*
(Continued)

*Primary Examiner* — Travis M Figg
(74) *Attorney, Agent, or Firm* — Oliff PLC

(57) ABSTRACT

A bonding sheet material for a weather strip disclosed herein is a composition including at least EPDM, a cross-linking agent, and carbon black, and has a volume resistivity of $1.0 \times 10^6$ Ω·cm or more based on a double ring electrode method of JIS-K6271-1: 2015 where a test piece has a thickness of 2 mm. When the composition is placed in a mold and molded to press the composition at 50° C. under 100 Kgf/cm$^2$ for 60 seconds whereby a molded article is produced, the molded article has a thickness change rate of 100% or less, the thickness change rate being represented by formula (1): Thickness change rate=((thickness of molded article after 30 minutes from releasing press–thickness of mold)/thickness of mold)×100.

8 Claims, 2 Drawing Sheets

(51) Int. Cl.
*B60J 10/21* (2016.01)
*B60J 10/84* (2016.01)

(56) References Cited

U.S. PATENT DOCUMENTS

| | | | |
|---|---|---|---|
| 6,487,820 B1* | 12/2002 | Nakajima | B29C 48/10 |
| | | | 49/490.1 |
| 2005/0095374 A1 | 5/2005 | Cothran et al. | |
| 2008/0102288 A1* | 5/2008 | Cothran | B29C 48/022 |
| | | | 428/447 |
| 2009/0171000 A1 | 7/2009 | Amemiya et al. | |
| 2013/0026717 A1* | 1/2013 | MacDonald | B60J 10/20 |
| | | | 29/527.1 |
| 2015/0273992 A1* | 10/2015 | Tsumura | B60J 10/84 |
| | | | 428/207 |
| 2017/0021707 A1* | 1/2017 | Sato | B60J 10/16 |
| 2018/0065455 A1* | 3/2018 | Ogawa | B60J 10/17 |
| 2018/0370343 A1* | 12/2018 | Hiroe | B29C 48/15 |
| 2019/0084209 A1* | 3/2019 | Hiroe | B29C 48/21 |
| 2019/0169412 A1* | 6/2019 | Sato | B60J 10/21 |
| 2019/0263238 A1* | 8/2019 | Hiroe | B60R 13/06 |

FOREIGN PATENT DOCUMENTS

| | | | |
|---|---|---|---|
| CN | 106661398 | A | 5/2017 |
| CN | 108883690 | A | 11/2018 |
| JP | S62-141037 | A | 6/1987 |
| JP | 2000-203264 | A | 7/2000 |
| JP | 2004-130552 | A | 4/2004 |
| JP | 2005-162982 | A | 6/2005 |
| JP | 2007-118634 | A | 5/2007 |
| JP | 2010-120378 | A | 6/2010 |
| JP | 2015-189774 | A | 11/2015 |
| JP | 2019-034578 | A | 3/2019 |
| KR | 10-2010-0007540 | A | 1/2010 |
| KR | 10-2018-0036630 | A | 4/2018 |

OTHER PUBLICATIONS

Jun. 8, 2021 Written Opinion Issued in International Patent Application No. PCT/JP2021/018241.
Jun. 8, 2021 International Search Report Issued in International Patent Application No. PCT/JP2021/018241.
Jun. 5, 2024 Office Action issued in Indian Patent Application No. 202227065149.
Jun. 19, 2025 Office Action issued in Chinese Patent Application No. 202180035601.4.

* cited by examiner

BONDING SHEET MATERIAL FOR WEATHER STRIP, WEATHER STRIP, AND METHOD FOR PRODUCING SAME

TECHNICAL FIELD

The present invention relates to a bonding sheet material for a weather strip, a weather strip, and a method for producing the same. More specifically, the present invention relates to a bonding sheet material for bonding opposite end portions of a weather strip material to each other, a weather strip using the bonding sheet material, and a method for producing the weather strip.

The present international application presides the priority based on Japanese Patent Application No. 2020-086087 filed on May 15, 2020, and the entire contents of the application are incorporated in the present specification as reference.

BACKGROUND ART

In general, in a vehicle such as an automobile, for sealing a gap that may occur between a peripheral edge of an opening portion of a vehicle body panel and an opening/closing member that is attached to the vehicle body panel so as to be openable and closable, a weather strip is disposed therebetween. An example of the weather strip includes a door weather strip (also referred to as a door seal, a door opening trim, or the like) disposed between a door opening portion of a vehicle body panel and a door.

As a method for producing such a weather strip, for example, the following Patent Literature 1 discloses a production method including the following steps: making a pair of end portions of a weather strip material face each other at a predetermined interval, and disposing a bonding sheet material between the facing end portions; and vulcanizing the bonding sheet material while pressing the weather strip material and the bonding sheet material against each other, and vulcanizing and bonding a main body portion formed of the weather strip material at a bonding portion formed of the bonding sheet material.

CITATION LIST

Patent Literature

Patent Literature 1: JP2004-130552A

SUMMARY OF INVENTION

The bonding sheet material is produced, for example, by press-molding a composition containing a non cross-linked rubber material and a cross-linking agent. The bonding sheet material may contain a filler component for the purpose of reinforcing, for example. When the bonding sheet material contains a conductive filler component such as carbon black, the bonding portion has electrical conductivity. Here, when the electrical conductivity of the bonding portion is high, electrochemical corrosion (electric corrosion, rust) occurs in the vehicle body panel through the bonding portion. Therefore, it is conceivable to reduce a blending ratio of the conductive filler component to reduce the electrical conductivity of the bonding portion.

However, according to the study of the present inventors, when the blending ratio of the conductive filler component is simply reduced, a blending ratio of the rubber material is relatively increased. Accordingly, when a pressure is released after the press-molding, a dimension of the bonding sheet material in a thickness direction is likely to be increased by an amount of elastic reduction in a dimension in a longitudinal direction. When the end portions of the weather strip material are bonded to each other by using the bonding sheet material having a large dimension in the thickness direction, a width of the bonding portion increases. As a result, when the weather strip is mounted on a vehicle, the appearance deteriorates, resulting in a problem of deterioration in appearance quality.

The present invention has been made to solve the above problems, and an object of the present invention is to provide a bonding sheet material for a weather strip, which can obtain a weather strip having a good appearance and excellent rust prevention of a vehicle body panel. Another object of the present invention is to provide a weather strip using the bonding sheet material and a method for producing the same.

The technique disclosed herein provides a bonding sheet material for a weather strip, the bonding sheet material being configured to bond opposite end portions of a weather strip material to each other. The bonding sheet material is a composition including at least EPDM, a cross-linking agent, and carbon black. The bonding sheet material has a volume resistivity of $1.0 \times 10^6$ Ω·cm or more based on a double ring electrode method of JIS-K6271-1: 2015 where a test piece has a thickness of 2 mm. When the composition is placed in a mold and molded to press the composition at 50° C. under 100 Kgf/cm$^2$ for 60 seconds whereby a molded article is produced, the molded article has a thickness change rate of 100% or less, the thickness change rate being represented by a formula (1), and the formula (1): Thickness change rate= ((thickness of molded article after 30 minutes from releasing press−thickness of mold)/thickness of mold)×100.

According to such a configuration, it is possible to prevent the dimension of the bonding sheet material from increasing in the thickness direction after the press-molding. By bonding the end portions of the weather strip material to each other using the bonding sheet material in which the dimension in the thickness direction is prevented from increasing, it is possible to obtain a weather strip with the inconspicuous bonding portion and good appearance. In addition, according to such a configuration, it is possible to reduce the electrical conductivity of the bonding portion. Thus, when the weather strip is mounted on a vehicle, rust of the vehicle body panel through the bonding portion can be prevented.

In a preferred aspect of the bonding sheet material disclosed herein, when a total amount of the composition configuring the bonding sheet material is defined as 100% by volume, the blending ratio of the carbon black is 11% or more by volume and 19% or less by volume. According to such a configuration, by defining the blending ratio of the carbon black in terms of volume ratio and setting the blending ratio within the above range, it is possible to suitably obtain a weather strip having a good appearance and excellent rust prevention of the vehicle body panel.

In another preferred aspect of the bonding sheet material disclosed herein, when a total amount of the composition configuring the bonding sheet material is defined as 100% by volume, the blending ratio of the carbon black is 11% or more by volume and 16% or less by volume. According to such a configuration, by defining the blending ratio of the carbon black in terms of volume ratio and setting the blending ratio within the above range, rust of the vehicle body panel can be prevented at a high level.

In addition, the technique disclosed herein provides a weather strip including a main body portion having end portions, and a bonding portion that bonds the opposite end portions of the main body portion to each other.

In a preferred aspect of the weather strip disclosed herein, the bonding portion is formed of a cross-linked product of any one of the bonding sheet materials disclosed herein. According to such a configuration, it is possible to suitably obtain a weather strip that has excellent appearance quality and rust prevention of a vehicle body panel.

In a preferred aspect of the weather strip disclosed herein, the bonding portion is formed of a cross-linked product of a bonding sheet material, and the bonding sheet material satisfies all of the following conditions: a composition including at least EPDM, a cross-linking agent, and carbon black; when a total amount of the composition configuring the bonding sheet material is defined as 100% by volume, a blending ratio of the carbon black is 11% or more by volume and 19% or less by volume; and a volume resistivity is $1.0 \times 10^6$ $\Omega \cdot m$ or more based on a double ring electrode method of JIS-K6271-1: 2015 where a test piece has a thickness of 2 mm. According to such a configuration, it is possible to suitably obtain a weather strip that has excellent appearance quality and rust prevention of the vehicle body panel.

In another preferred aspect of the weather strip disclosed herein, the bonding sheet material has a thickness of 1.0 mm or less. According to such a configuration, the bonding portion is less conspicuous, and appearance quality of the weather strip can be further improved.

Further, the technique disclosed herein provides a method for producing a weather strip including a main body portion having end portions and a bonding portion that bonds the opposite end portions of the main body portion to each other, includes: preparing a weather strip material for forming the main body portion and a bonding sheet material for forming the bonding portion; and cross-linking the bonding sheet material by placing the bonding sheet material between the opposite end portions of the weather strip material. The bonding sheet material satisfies all of the following conditions: a composition including at least EPDM, a cross-linking agent, and carbon black, a volume resistivity of $1.0 \times 10^6$ $\Omega \cdot cm$ or more based on a double ring electrode method of JIS-K6271-1: 2015 where a test piece has a thickness of 2 mm, when the composition is placed in a mold and molded to press the composition at 50° C. under 100 Kgf/cm$^2$ for 60 seconds whereby a molded article is produced, the molded article has a thickness change rate of 100% or less, the thickness change rate being represented by a formula (1), and the formula (1): Thickness change rate= ((thickness of molded article after 30 minutes from releasing press−thickness of mold)/thickness of mold)×100.

According to such a configuration, the bonding portion can be formed between the main body portions by cross-linking and bonding the bonding sheet material. Accordingly, the main body portion and the bonding portion can be firmly bonded to each other. In addition, it is possible to suitably produce a weather strip that has excellent appearance quality and rust prevention of a vehicle body panel.

In a preferred aspect of the weather strip production method disclosed herein, the preparing includes producing the bonding sheet material by putting the composition into a press mold and molding to press the composition. According to such a configuration, the bonding portion can be efficiently formed, and the productivity of the weather strip can be improved.

In another preferred aspect of the weather strip production method disclosed herein, the preparing includes using the press mold having a thickness of 0.5 mm or more when the mold is closed. According to such a configuration, it is possible to obtain good releasability after press-molding. As a result, the weather strip can be stably produced, and moldability and workability can be improved.

In another preferred aspect of the weather strip production method disclosed herein, the preparing includes preparing the bonding sheet material having a thickness of 1.0 mm or less. According to such a configuration, it is possible to produce a weather strip with a less conspicuous bonding portion and particularly excellent appearance quality.

DESCRIPTION OF EMBODIMENTS

Hereinafter, preferred embodiments of a technique disclosed herein will be described. Matters other than the matters particularly referred to in the present specification and matters necessary for carrying out the present technique can be understood as design choice of a person skilled in the art based on the related art. The present technique can be implemented based on matters disclosed in the present specification and the drawings and common technical knowledge in the field. In the present specification, the notation of "A to B" indicating the range includes the meaning of "preferably larger than A" and "preferably smaller than B" in addition to the meaning of A or more and B or less.

<<Weather Strip>>

Figure 1:
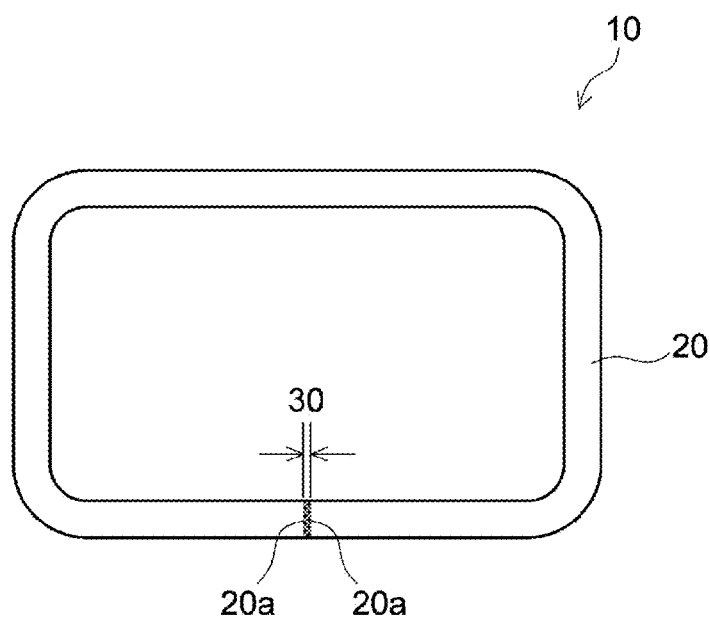
FIG. 1 is a front view of a weather strip according to an embodiment disclosed herein.

FIG. 1 is a front view of a weather strip 10 according to an embodiment of the present technique. The weather strip 10 is attached to a periphery (attached portion) of a back door of a vehicle body panel, and seals a gap between a back door opening portion and the back door. As a result, it is possible to prevent wind and rain, dust, noise, and the like from entering from the outside, and improve comfort in a vehicle. Here, the weather strip 10 has an annular shape (ring shape). The weather strip 10 includes a main body portion 20 having a pair of end portions 20a, and a bonding portion 30 that bonds the opposite end portions 20a of the main body portion 20 to each other. Although one main body portion 20 and one bonding portion 30 are provided here, two or more main body portions 20 and/or two or more bonding portions 30 may be provided. The main body portion 20 includes, for example, a first main body portion and a second main body portion, and may include a pair of end portions of the first main body portion, a pair of end portions of the second main body portion, and the bonding portion 30 that bonds the end portions of the first main body portion and the end portions of the second main body portion.

Figure 2:
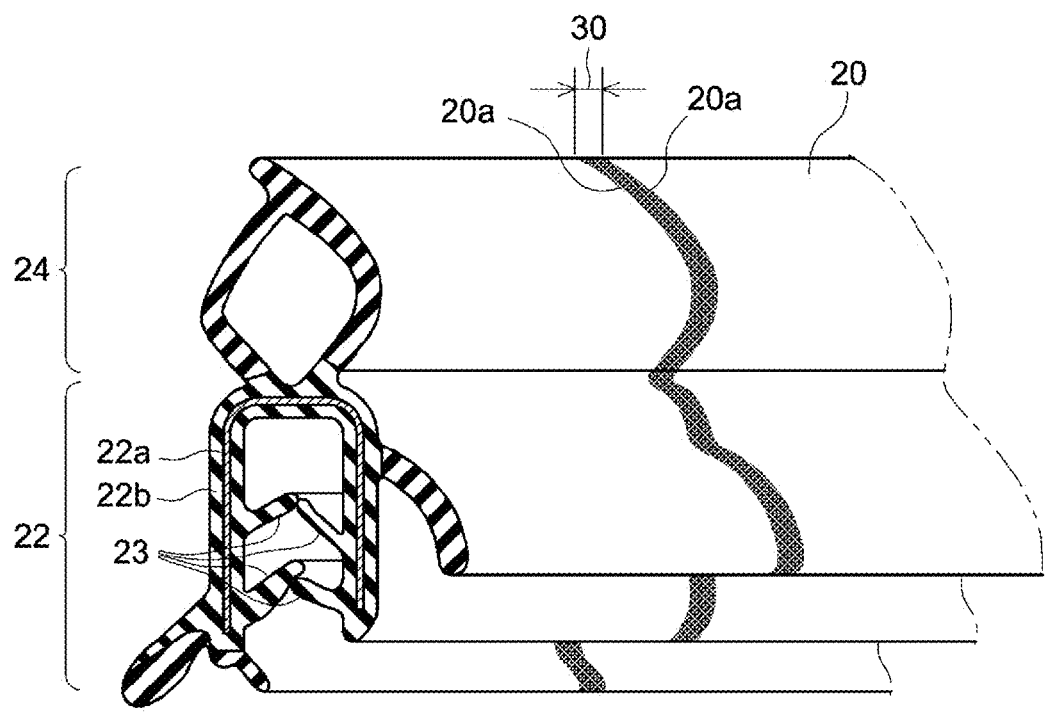
FIG. 2 is a partial perspective view obtained by partially breaking the weather strip of FIG. 1.

FIG. 2 is a partial perspective view obtained by partially breaking the weather strip 10. The main body portion 20 is made of a weather strip material to be described later. The main body portion 20 is integrally and continuously molded typically by an extrusion molding method. The main body portion 20 preferably has flexibility. The pair of end portions 20a of the main body portion 20 have substantially the same shape and have substantially the same cross-sectional area (production error is allowable). Here, the main body portion 20 includes an attachment portion 22 having a substantially U-shaped cross section, and a hollow seal portion 24.

The attachment portion 22 is a portion for fixing the weather strip 10 to the vehicle body panel. The attachment portion 22 is attached to the attached portion of the vehicle body panel. Here, the attachment portion 22 is attached to a flange (not shown) provided along an opening edge of the back door. The attachment portion 22 includes a core metal 22a that is bent in a substantially U-shape, and a covering portion 22b that covers the core metal 22a. The core metal 22a is embedded inside the covering portion 22b by insert molding. A plurality of holding lips 23 (four holding lips 23 in FIG. 2) are provided on an inner wall surface of the attachment portion 22. Each of the holding lips 23 extends toward the inside of the substantially U-shaped attachment portion 22. The plurality of holding lips 23 are disposed facing each other so as to form pairs on a vehicle inner side and a vehicle outer side. The holding lips 23 sandwich the attached portion (flange) of the vehicle body panel from both the vehicle inner side and the vehicle outer side, thereby holding the attached portion.

The seal portion 24 is a portion that seals the gap between the back door opening portion and the back door when the back door is closed. The seal portion 24 typically has higher flexibility than the attachment portion 22. The seal portion 24 is configured to be elastically deformable. When the back door is in contact with the seal portion 24 when the back door is closed, the seal portion 24 is elastically deformed. Accordingly, the gap between the back door opening portion and the back door is sealed by the seal portion 24. The seal portion is not limited to the hollow shape as shown in FIG. 2, and may have, for example, a lip shape.

The bonding portion 30 is interposed between the pair of end portions 20a of the main body portion 20. The bonding portion 30 is a portion that serves as a seam where the main body portion 20 is bonded. The bonding portion 30 is formed of a cross-linked product of a bonding sheet material 3 (see FIGS. 3A to 3D) to be described later. The bonding portion 30 may have flexibility. The bonding portion 30 is made of a material that has high compatibility (that is easily blended) with the weather strip material. The bonding portion 30 contains a cross-linked product of ethylene propylene diene rubber (EPDM) and carbon black. The bonding portion 30 may contain the cross-linked product of the EPDM as a first component (a component having the highest blending ratio in terms of mass ratio, the same applies hereinafter), or may contain the cross-linked product of the EPDM as a main component (a component occupying 50% or more by volume of a total amount of the bonding portion 30, the same applies hereinafter).

<<Production Method of Weather Strip>>

The weather strip 10 can be produced by disposing the bonding sheet material 3 (see FIGS. 3A to 3D) between opposite end portions of a weather strip material and bonding the end portions of the weather strip material to each other via the bonding sheet material 3. The weather strip 10 can be produced by, for example, a production method including the following preparation step and vulcanization bonding step. The vulcanization bonding step is an example of a cross-linking step. It is not prohibited to include other steps in any stage. Hereinafter, the steps will be described.

In the preparation step, the weather strip material and the bonding sheet material 3 (see FIGS. 3A to 3D) are prepared. The weather strip material is used to form the main body portion 20 of the weather strip 10. The weather strip material may be the same as that used in the related art for this type of application, and a material, properties, a shape, and the like thereof are not particularly limited. The weather strip material may be made of rubber such as EPDM or chloroprene rubber. The weather strip material may be in a state in which vulcanization is completed. The weather strip material may include a portion forming the attachment portion 22 and a portion forming the hollow seal portion 24. The weather strip material may have different materials and properties between the portion forming the attachment portion 22 and the portion forming the seal portion 24.

The bonding sheet material 3 (see FIGS. 3A to 3D) is used to form the bonding portion 30 of the weather strip 10. The bonding sheet material 3 is used to bond the opposite end portions of the weather strip material to each other. The bonding sheet material 3 may have a thickness t (see FIGS. 3A to 3D) of approximately 5.0 mm or less, preferably 3.0 mm or less, more preferably 2.0 mm or less, particularly preferably 1.0 mm or less, and further preferably 0.9 mm or less. Accordingly, it is possible to produce the weather strip 10 with the less conspicuous bonding portion 30 and particularly excellent appearance quality. The thickness t of the bonding sheet material 3 may be approximately 0.1 mm or more, for example, 0.3 mm or more, or 0.5 mm or more.

The bonding sheet material 3 is a composition containing, as essential components, non cross-linked ethylene propylene diene rubber (EPDM), a cross-linking agent, and carbon black. Here, the bonding sheet material 3 is a composition containing un-vulcanized EPDM, a vulcanizing agent, and carbon black. The bonding sheet material 3 may contain the EPDM as the first component, or may contain the EPDM as the main component. The bonding sheet material 3 will be described in detail later.

The bonding sheet material 3 can be produced by a known method in the related art, for example, molding, extrusion molding, roll molding, calendar molding, or the like. In a preferred embodiment, the bonding sheet material 3 can be produced, for example, as follows.

Figure 3A:
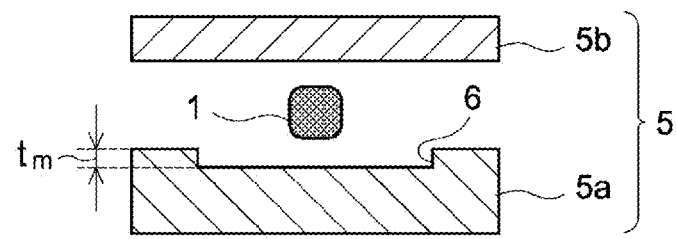
FIGS. 3A to 3D are cross-sectional views showing an example of a production method of a bonding sheet material.

FIGS. 3A to 3D are cross-sectional views showing an example of a production method of the bonding sheet material 3. In this production method, the bonding sheet material 3 is produced by molding a mass composition 1 having fluidity into a sheet shape using a sheet mold S. Specifically, first, as shown in FIG. 3A, the composition 1 and the sheet mold 5 are prepared. The composition 1 contains at least the essential components (that is, EPDM, a cross-linking agent, and carbon black) of the bonding sheet material 3 described above. The composition 1 may be in a paste form or a pellet form. The sheet mold 5 is an example of a press mold. Here, the sheet mold 5 includes a lower mold Sa having a molding space 6, and an upper mold 5b that closes the molding space 6 of the lower mold 5a.

The molding space 6 of the lower mold Sa may have a thickness (average thickness) $t_m$ of approximately 0.1 mm or more, preferably 0.5 mm or more when the mold is closed. Accordingly, it is possible to prevent a decrease in rigidity of the bonding sheet material 3 after molding, improve mold releasability, and improve moldability and workability. In addition, the thickness $t_m$ when the mold is closed may be approximately 5.0 mm or less, preferably 3.0 mm or less, or 2.0 mm or less, for example, 1.0 mm or less. Accordingly, it is possible to produce the weather strip 10 with the less conspicuous bonding portion 30 and particularly excellent appearance quality.

Figure 3B:
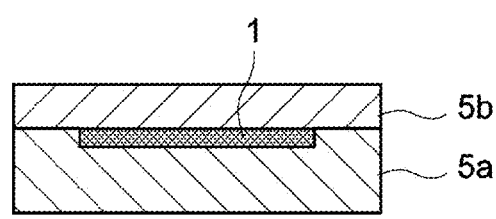
Figure 3C:
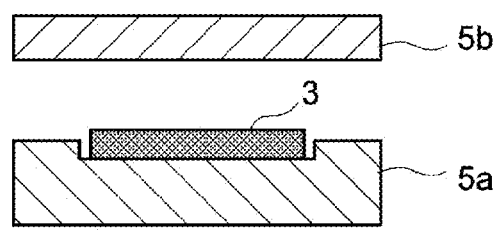
Figure 3D:
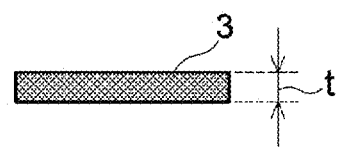

Next, the composition 1 is put into the molding space 6 of the prepared lower mold Sa. Next, as shown in FIG. 3B, the upper mold 5b is closed with respect to the lower mold Sa, and the composition 1 is sandwiched between the lower mold 5a and the upper mold 5b. At this time, the sheet mold 5 may be appropriately subjected to heating, pressing, or the like. Thus, the composition 1 is formed into a sheet shape. Next, as shown in FIG. 3C, the upper mold 5b is opened, and the bonding sheet material 3 is taken out from the lower mold Sa. At this time, in the related art, as described above, for example, when an applied pressure is released and the bonding sheet material 3 is taken out from the sheet mold 5, the bonding sheet material is easily elastically deformed. Specifically, a dimension in a thickness direction is likely to be increased by an amount of a decrease in a dimension in a longitudinal direction. With this regard, in the present technique, it is possible to prevent the dimension of the bonding sheet material 3 from increasing in the thickness direction. As described above, as shown in FIG. 3D, the bonding sheet material 3 having a substantially uniform thickness t can be produced.

In the vulcanization bonding step, for example, first, the pair of end portions of the weather strip material are opposite to each other at a predetermined interval. Next, the bonding sheet material 3 is disposed between the opposite end portions. Next, the bonding sheet material 3 is vulcanized to cross-link and cure the EPDM. As a result, the end portions of the weather strip material are cross-linked and bonded (vulcanized and bonded in this case) to each other via the bonding sheet material 3. A method of bonding the end portions of the weather strip material to each other is not particularly limited, and may be the same as in the related art. In a preferred embodiment, the present step can be performed using a manufacturing apparatus as described in Patent Literature 1, for example. The manufacturing apparatus described in Patent Literature 1 includes a holding mechanism having a pair of holding molds arranged to face each other and capable of moving the pair of holding molds in a direction toward and away from each other, and a heater for heating the holding molds.

When the present step is performed using this manufacturing apparatus, for example, first, the opposite end portions of the weather strip material that is vulcanized are set in the pair of holding molds, respectively. The bonding sheet material 3 is set between the pair of holding molds. Next, the pair of holding molds are relatively brought close to each other and brought into contact with each other with the bonding sheet material 3 sandwiched therebetween. In this state, the heater is driven to heat a portion (contact surface portion) of the bonding sheet material 3 in contact with the weather strip material. A heating temperature may be adjusted so as to accelerate a cross-linking reaction (vulcanization reaction) at least at the contact surface portion of the bonding sheet material 3. For example, the pair of holding molds may be heated at approximately 180° C. or higher, e.g., 180° C. to 250° C. As a result, the contact surface portion of the bonding sheet material 3 can be softened and blended with the weather strip material, and the bonding sheet material 3 can be suitably cross-linked and cured.

As described above, by performing the present step using the manufacturing apparatus as described in Patent Literature 1, it is possible to bond and integrate the opposite end portions of the weather strip material while maintaining good sealing properties of the seal portion 24.

<<Bonding Sheet Material for Weather Strip>>

Next, the bonding sheet material 3 will be described. As described above, the bonding sheet material 3 is used to form the bonding portion 30 of the weather strip 10. The bonding sheet material 3 is used to bond opposite end portions of a weather strip material. The bonding sheet material 3 is a composition containing ethylene propylene diene rubber (EPDM), a cross-linking agent, and carbon black as essential blending components.

The EPDM is a base polymer obtained by copolymerizing ethylene, propylene, and diene. The EPDM is not particularly limited, and those used in the related art for this type of application can be used singly or in combination of two or more. Although not particularly limited, when a total amount of the composition constituting the bonding sheet material 3 is 100% by volume, a blending ratio of the EPDM may be higher than a blending ratio of the carbon black. The blending ratio of the EPDM may be approximately 30% or more by volume, typically 40% or more by volume, for example, 50% or more by volume, and may be approximately 89% or less by volume, typically 80% or less by volume, for example, 70% or less by volume, and further 60% or less by volume. By setting the containing ratio of the EPDM to a predetermined value or more, at least one of water resistance, weather resistance, heat resistance, and elasticity can be improved. In addition, by setting a containing ratio of the EPDM to the above range, it is possible to suitably obtain a weather strip having a good appearance and excellent rust prevention of the vehicle body panel.

The cross-linking agent is a component for cross-linking the EPDM. The cross-linking agent is not particularly limited, and those used in the related art for this type of application can be used singly or in combination of two or more. An example of the cross-linking agent is a vulcanizing agent. Specific examples of the vulcanizing agent include sulfur cross-linking agents such as sulfur, sulfur dichloride, morpholine disulfide (DTDM), dithio dicaprolactam (DTDC), and alkylphenol disulfide (APDS). Although not particularly limited, when the EPDM is 100 parts by mass, a blending ratio PHR (per hundred rubber) of the cross-linking agent may be approximately 0.1 parts by mass to 20 parts by mass, typically 0.2 parts by mass to 10 parts by mass, for example, 0.5 parts by mass to 5 parts by mass.

The carbon black is a component that improves mechanical properties (for example, strength) of a composition containing the EPDM as a base polymer by being added to the composition. The carbon black is not particularly limited, and those used in the related art for this type of application can be used singly or in combination of two or more. Although not particularly limited, an average particle diameter of the carbon black (a particle diameter corresponding to 50% accumulation from a fine particle side in number-based particle size distribution based on electron microscope observation) may be approximately 1 nm to 1000 nm, preferably 10 nm to 100 nm, for example, 40 nm to 90 nm. A specific surface area of the carbon black (a value obtained by analyzing, using a BET method, a surface area measured by a constant volume adsorption method (nitrogen gas adsorption method) using nitrogen gas) may be approximately 1 $m^2/g$ to 1000 $m^2/g$, preferably 10 $m^2/g$ to 100 $m^2/g$, for example, 20 $m^2/g$ to 50 $m^2/g$. An iodine adsorption amount (a value measured in accordance with JIS-K6217-1: 2015) may be approximately 1 mg/g to 100 mg/g, preferably 10 mg/g to 50 mg/g, for example, 20 mg/g to 40 mg/g. DBP absorption (measured in accordance with JI-K6217-1: 2008) of the carbon black may be approximately 10 ml/100 g to 1000 ml/100 g, preferably 50 ml/100 g to 200 ml/100 g, for example, 100 ml/100 g to 150 ml/100 g. By satisfying at least one (preferably two or more) of the above properties, it is possible to improve at least one of the workability in preparing the bonding sheet material 3, reinforcing properties of the bonding sheet material 3, appearance quality, and rust prevention of a vehicle body panel.

Although not particularly limited, when the EPDM is 100 parts by mass, a blending ratio PHR (per hundred rubber) of the carbon black may be approximately 1 part by mass to 200 parts by mass, typically 10 parts by mass to 100 parts by mass, for example, 40 parts by mass to 80 parts by mass, or 60 parts by mass to 74 parts by mass. When a containing ratio of the carbon black is within the above range, suitable reinforcing properties can be imparted to the bonding sheet material 3.

Although not particularly limited, when the total amount of the composition constituting the bonding sheet material 3 is defined as 100% by volume, the blending ratio of the carbon black may be approximately 5% or more by volume, preferably 10% or more by volume, more preferably 11% or more by volume, and particularly preferably 15% or more by volume. The blending ratio of the carbon black may be less than the blending ratio of the EPDM, and may be approximately 30% or less by volume, preferably 20% or less by volume, more preferably 19% or less by volume, and particularly preferably 16% or less by volume. When the blending ratio of the carbon black is defined by volume ratio and is set to a predetermined value or more, the weather strip 10 with the inconspicuous bonding portion 30 and good appearance can be obtained. In addition, when the blending ratio of the carbon black is defined by volume ratio and is set to a predetermined value or less, a desired volume resistivity can be suitably achieved, and rust of the vehicle body panel through the bonding portion 30 can be prevented at a high level.

The reason why the blending ratio of the carbon black is defined on a volume basis is that a specific gravity greatly varies depending on blending components. For example, a specific gravity of the carbon black (specific gravity: 1.8) and a specific gravity of EPDM (specific gravity: 0.87) are different by two times or more. The specific gravity of the carbon black (specific gravity: 1.8) and a specific gravity of a vulcanization activator described later, for example, zinc oxide (specific gravity: 5.2) may be different by 5 times or more. According to the study by the present inventors, by defining the blending ratio of the carbon black on a volume basis, it is possible to more accurately define a range in which effects of the technique disclosed herein can be exhibited than by defining the blending ratio on a mass basis.

The bonding sheet material may contain other blending components (any components) in addition to the EPDM, the cross-linking agent, and the carbon black described above. Examples of any components include a plasticizer (softener), a filler other than carbon black, a vulcanization activator, a vulcanization accelerator, a processing aid, a de-foaming agent, a foaming agent, an antioxidant, and a colorant. These components used in the related art for this type of application can be used singly or in combination of two or more. Although not particularly limited, when the EPDM is 100 parts by mass, a total blending ratio PHR (per hundred rubber) of the components may be approximately 100 parts or less by mass, for example, 10 parts by mass to 100 parts by mass, 30 parts by mass to 80 parts by mass, or 50 parts by mass to 70 parts by mass.

Examples of the plasticizer include paraffinic process oils. Although not particularly limited, when the EPDM is 100 parts by mass, a blending ratio PHR (per hundred rubber) of the plasticizer may be approximately 10 parts by mass to 80 parts by mass, typically 20 parts by mass to 70 parts by mass, for example, 30 parts by mass to 60 parts by mass. By setting a containing ratio of the plasticizer to a predetermined value or more, the viscosity of the composition 1 can be lowered, and the workability in preparing the bonding sheet material 3 can be improved. Further, the bonding portion 30 with reduced electrical conductivity can be suitably obtained. In addition, by setting the containing ratio of the plasticizer to a predetermined value or less, the rigidity of the bonding sheet material 3 can be improved.

Examples of the filler other than carbon black include insulating inorganic fillers generally called white inorganic fillers. Specific examples include clay, talc, diatomaceous earth, mica, silicic acid, silicates, calcium carbonates, and the like. Although not particularly limited, when the EPDM is 100 parts by mass, a blending ratio PHR (per hundred rubber) of the filler other than carbon black (typically a white inorganic filler) is usually smaller than the blending ratio of the carbon black, and may be approximately 20 parts or less by mass, typically 10 parts or less by mass, for example, 5 parts or less by mass.

Examples of the vulcanization activator include zinc oxide. Although not particularly limited, when the EPDM is 100 parts by mass, a blending ratio PHR (per hundred rubber) of the vulcanization activator is usually smaller than the blending ratio of the carbon black, and may be approximately 20 parts or less by mass, typically 10 parts or less by mass, for example, 5 parts or less by mass. The blending ratio PHR of the vulcanization activator may be approximately 0.1 parts or more by mass, for example, 1 part or more by mass.

Examples of the vulcanization accelerator include thiuram-based di pentamethylene thiuram tetrasulfide (DPTT), dithiocarbamate-based Zinc (N-ethyl-N-phenyl dithiocarbamate) (ZnEPDC), and thiazole-based 4-(-2-benzothiazolyl dithio) morpheline (MDB). Although not particularly limited, when the EPDM is 100 parts by mass, a blending ratio PHR (per hundred rubber) of the vulcanization accelerator is usually smaller than the blending ratio of the carbon black, and may be approximately 20 parts or less by mass, typically 10 parts or less by mass, for example, 5 parts or less by mass. The blending ratio PHR of the vulcanization accelerator may be approximately 0.1 parts or more by mass, for example, 1 part or more by mass.

Examples of the processing aid include fatty acids such as stearic acid and lubricants such as fatty acid esters. Although not particularly limited, when the EPDM is 100 parts by mass, a blending ratio PHR (per hundred rubber) of the processing aid is usually smaller than the blending ratio of the carbon black, and may be approximately 20 parts or less by mass, typically 10 parts or less by mass, for example, 5 parts or less by mass. The blending ratio PHR of the processing aid may be approximately 0.1 parts or more by mass, for example, 1 part or more by mass.

Examples of the de-foaming agent include calcium oxide. Although not particularly limited, when the EPDM is 100 parts by mass, a blending ratio PHR (per hundred rubber) of the de-foaming agent is usually smaller than the blending ratio of the carbon black, and may be approximately 30 parts or less by mass, typically 20 parts or less by mass, for example, 10 parts or less by mass. The blending ratio PHR of the de-foaming agent may be approximately 0.1 parts or more by mass, typically 1 part or more by mass, for example, 5 parts or more by mass. Examples of the foaming agent include p,p'-oxybisbenzene sulfonyl hydrazide (OBSH), sodium bicarbonate, and thermally expandable microcapsules.

When a molded article is produced by placing a composition constituting the bonding sheet material 3 in a predetermined mold (for example, the sheet mold 5 as shown in FIG. 3A) and press-molding the composition at 50° C. under 100 Kgf/cm² for 60 seconds, a thickness change rate represented by the above formula (1) is preferably 100% or less. The thickness change rate is preferably 80% or less, and more preferably 65% or less. As a result, a dimension of the composition can be prevented from increasing in a thickness direction after press-molding, and the bonding portion 30 is less conspicuous when the weather strip 10 is mounted on a vehicle. Therefore, the appearance quality of the weather strip 10 can be improved. The thickness change rate typically exceeds 0%, and may be approximately 10% or more, or 20% or more, for example, 50% or more.

The bonding sheet material 3 may have a volume resistivity (a value measured in accordance with a double ring electrode method of JIS-K6271-1: 2015 (thickness of test piece: 2 mm)) of $1.0 \times 10^6$ Ω·cm or more. The volume resistivity is preferably $1.5 \times 10^6$ Ω·cm or more, and more preferably $1.9 \times 10^6$ Ω·cm or more. As a result, the electrical conductivity of the bonding portion 30 can be reduced, and rust of a vehicle body panel through the bonding portion 30 can be prevented when the weather strip 10 is mounted on a vehicle.

As described above, according to the bonding sheet material 3, it is possible to form the bonding portion 30 between opposing end portions of a weather strip material without causing a sense of discomfort. As a result, a continuous and united appearance between the main body portion 20 and the bonding portion 30 can be obtained, and the weather strip 10 with good appearance can be obtained. In addition, according to the bonding sheet material 3, it is possible to obtain the weather strip 10 in which the electrical conductivity of the bonding portion 30 is reduced and the vehicle body panel is unlikely to rust through the bonding portion 30. Further, a door opening portion of a vehicle and a door can be closed without a gap, and excellent sealing properties can be achieved.

The technique disclosed herein can be applied to a weather strip of any form. For example, the technique can be applied to a weather strip that seals between a peripheral edge of an opening portion and an opening/closing member in a door portion (for example, a back door portion, a front door portion, or a rear door portion), a trunk portion, or a sunroof portion of a vehicle. In particular, the technique can be suitably applied to the annular weather strip 10 as shown in FIG. 1.

Hereinafter, examples related to the technique disclosed herein will be described, and the present technique is not intended to be limited to those shown in the examples.

Preparation of Compositions (Examples 1 to 3, Comparative Examples 1 and 2)

Compositions of Examples 1 to 3 and Comparative Examples 1 and 2 were prepared by blending blending components shown in Table 1 at a blending ratio PHR (per hundred rubber) shown in Table 2 and kneading the blended components with a kneader. The compositions of Examples 1 to 3 and Comparative Examples 1 and 2 are different from each other only in a type and/or blending ratio of carbon black. Then, electrical conductivity (volume resistivity), a thickness change rate, and appearance quality of each of the compositions were evaluated as follows.

[Table 1]

TABLE 1

| Blending Component of Composition | |
|---|---|
| EPDM | "EPT4045M" manufactured by Mitsui Chemicals, Inc. |
| Carbon black | "Asahi #60UG" or "Asahi #50HG" manufactured by Asahi Carbon Co., Ltd. |
| Plasticizer | Paraffinic process oil ("Diana Process PW90" manufactured by Idemitsu Kosan Co., Ltd.) |
| Vulcanization activator | Zinc oxide ("META-Z 102" manufactured by Inoue-calcium.co.jp) |
| Processing aid | Stearic acid ("MXST" manufactured by Miyoshi Oil & Fat Co., Ltd.) |
| De-foaming agent | Calcium oxide ("VESTA-C80N" manufactured by Inoue-calcium.co.jp) |
| Vulcanizing agent (Sulfur cross-linking agent) | Sulfur ("Golden flower sulfur powder 200 Mesh" manufactured by Tsurumi Chemical Industry Co., ltd.) |
| Vulcanization accelerator | A mixture of thiazole-based MBT ("Nocceler M-P" manufactured by Ouchi Shinko Chemical Industrial Co., Ltd.), thiazole-based MDB ("Nocceler MDB" manufactured by the same company), dithiocarbamate ZnBDC ("Nocceler BZ-P" manufactured by the same company), and dithiocarbamate ZnMDC ("Nocceler PZ" manufactured by the same company) was used. |

TABLE 2

| Blending ratio PHR of composition and evaluation result | | | | | | | |
|---|---|---|---|---|---|---|---|
| | (PHR/part by mass) | | Example 1 | Example 2 | Comparative Example 1 | Example 3 | Comparative Example 2 |
| Blending component | EPDM | | | | 100 | | |
| | Carbon black | Asahi #60UG | 60 | 40 | 30 | — | 74 |
| | | Asahi #50HG | — | — | — | 74 | — |
| | Plasticizer | | | | 46 | | |
| | Vulcanization activator | | | | 3 | | |
| | Processing aid | | | | 4.5 | | |
| | De-foaming agent | | | | 8 | | |
| | Vulcanizing agent (Sulfur cross-linking agent) | | | | 1 | | |
| | Vulcanization accelerator | | | | 2.85 | | |

TABLE 2-continued

Blending ratio PHR of composition and evaluation result

| (PHR/part by mass) | Example 1 | Example 2 | Comparative Example 1 | Example 3 | Comparative Example 2 |
|---|---|---|---|---|---|
| Blending ratio of carbon black on a volume basis | 15.8% by volume | 11.1% by volume | 8.5% by volume | 18.7% by volume | 18.7% by volume |
| Evaluation result of electrical conductivity Volume resistivity (Ω · cm) | $1.0 \times 10^6$ Ω · cm | $1.8 \times 10^{10}$ Ω · cm | $6.9 \times 10^{12}$ Ω · cm | $1.9 \times 10^6$ Ω · cm | $7.6 \times 10^4$ Ω · cm |
| Determination | ○ | ○ | ○ | ○ | X |
| Evaluation result of thickness change rate Thickness t (mm) after 30 minutes | 0.82 | 0.90 | 1.07 | 0.80 | 0.83 |
| Thickness change rate (%) | 64% | 80% | 114% | 60% | 67% |
| Determination | ○ | ○ | X | ○ | ○ |
| Evaluation result of appearance quality | Excellent | Good | (Reference) | Excellent | Good |

[Calculation Formula of Blending Ratio (Volume Basis) of Carbon Black]

Table 2 also shows the blending ratio of the carbon black on a volume basis calculated from the following calculation formula (% by volume when a total amount of the composition is defined as 100% by volume).

Volume $Vi$ of each blending component=blending ratio PHR/specific gravity

Blending ratio of carbon black (% by volume)=(volume of carbon black/total blending volume $\Sigma Vi$)×100

For example, in the case of Example 3, the volume Vi and the blending ratio (volume basis) of each blending component can be calculated as shown in Table 3.

[Table 3]

TABLE 3

Volume Vi and blending ratio (volume basis) of each blending component in Example 3

| | Specific gravity | Blending ratio PHR | Volume Vi | Blending ratio (volume basis) |
|---|---|---|---|---|
| EPDM | 0.87 | 100 | 114.9 | 52.3% by volume |
| Carbon black | 1.8 | 74 | 41.1 | 18.7% by volume |
| Plasticizer | 0.87 | 46 | 52.9 | 24.1% by volume |
| Vulcanization activator | 5.2 | 3 | 0.6 | 0.3% by volume |
| Processing aid | 1 | 4.5 | 4.5 | 2.0% by volume |
| De-foaming agent | 2.84 | 8 | 2.8 | 1.3% by volume |
| Vulcanizing agent (Sulfur cross-linking agent) | 1.2 | 1 | 0.8 | 0.4% by volume |
| Vulcanization accelerator | 1.4 | 2.85 | 2.0 | 0.9% by volume |
| $\Sigma Vi$ | — | — | 219.7 | — |

[Evaluation of Electrical Conductivity (Volume Resistivity)]

First, the composition prepared above was molded into a sheet shape having a thickness of 2 mm by press-molding to prepare a test piece. Next, the volume resistivity was measured in accordance with the double ring electrode method of JIS-K6271-1: 2015. As a test device, a digital ultra high resistance/micro ammeter 5451 (manufactured by ADC Corporation) was used. The volume resistivity (ρ) was calculated by the following formula (2): ρ (unit: Ω·cm)=(V/I)× (π×d2)/(4×t) (2). Here, V is a voltage (volt) applied to the test piece, I is a current (ampere) after one minute of voltage application, π is the circular constant, dis an outer diameter (cm) of a main electrode, and tis a thickness (cm) of the test piece. Test pieces having a volume resistivity of $1.0 \times 10^6$ Ω·cm or more were evaluated as "○", and test pieces having a volume resistivity of less than $1.0 \times 10^6$ Ω·cm were evaluated as "x". The results are shown in Table 2.

[Evaluation of Thickness Change Rate]

First, the composition prepared as described above was put into the sheet mold 5 (thickness $t_m$ when mold closed: 0.5 mm) of FIG. 3A, and press-molded at 50° C. under 100 Kgf/cm² for 60 seconds to prepare a molded article. Next, a thickness (mm) of the molded article 30 minutes after press release was read, and the thickness change rate (%) of the molded article was calculated according to the above formula (1). Then, when the thickness change rate was 100% or less (in other words, the thickness t of the molded article 30 minutes after press release was twice or less the thickness $t_m$ of the mold when closed), it was determined as "○", and when the thickness change rate exceeded 100%, it was determined as "X". The results are shown in Table 2.

[Evaluation of Appearance Quality]

By using the molded article produced for the measurement of the thickness change rate described above, opposite end portions of a weather strip material were bonded to each other. Specifically, molding was performed using a manufacturing apparatus as described in Patent Literature 1, and a bonding portion was formed between the pair of end portions of the weather strip material. In this way, a weather strip having the bonding portion formed of the molded article between main body portions formed of the weather strip material was obtained. Then, the appearance quality of the obtained weather strip was visually evaluated. The results are shown in Table 2. In Table 2, with a weather strip of Comparative Example 1 as a benchmark, a weather strip in which the bonding portion was less conspicuous than that of Comparative Example 1 was determined to be "good", and a weather strip in which the appearance quality was particularly excellent was determined to be "excellent".

As shown in the evaluation results of Table 2, in Comparative Example 1, the volume resistivity was $1.0 \times 10^6$ Ω·cm or more, and the electrical conductivity was reduced, but the thickness change rate greatly exceeded 100%. In Comparative Example 2, although the thickness change rate was reduced to 100% or less, the volume resistivity was significantly lower than $1.0 \times 10^6$ Ω·cm. In contrast, in all of Examples 1 to 3, the volume resistivity was $1.0 \times 10^6$ Ω·cm, and the electrical conductivity was reduced. In addition, the weather strip having a thickness change rate less than 100%, and good appearance with a relatively inconspicuous bonding portion as compared with Comparative Example 1 was obtained.

Specific examples of the technique disclosed herein have been described in detail above, and these are merely examples and do not limit the scope of the claims. The technique described in the claims includes various modifications and changes of the specific examples illustrated above.

The invention claimed is:

1. A bonding sheet material for a weather strip, the bonding sheet material being configured to bond opposite end portions of a weather strip material to each other, wherein
 the bonding sheet material is a composition including at least EPDM, a cross-linking agent, and carbon black,
 the bonding sheet material has a volume resistivity of $1.0 \times 10^6$ $\Omega \cdot$cm or more based on a double ring electrode method of JIS-K6271-1: 2015 where a test piece has a thickness of 2 mm,
 when the composition is placed in a mold and molded to press the composition at 50° C. under 100 Kgf/cm$^2$ for 60 seconds whereby a molded article is produced, the molded article has a thickness change rate of 100% or less, the thickness change rate being represented by a formula (1),
 the formula (1): Thickness change rate=((thickness of molded article after 30 minutes from releasing press−thickness of mold)/thickness of mold)×100, and
 when a total amount of the composition configuring the bonding sheet material is defined as 100% by volume, a blending ratio of the carbon black is 11% or more by volume and 19% or less by volume.

2. The bonding sheet material according to claim 1, wherein
 when a total amount of the composition configuring the bonding sheet material is defined as 100% by volume, a blending ratio of the carbon black is 16% or less by volume.

3. A weather strip comprising:
 a main body portion having end portions; and
 a bonding portion that bonds the opposite end portions of the main body portion to each other, wherein
 the bonding portion is formed of a cross-linked product of the bonding sheet material according to claim 1.

4. The weather strip according to claim 3, wherein
 the bonding sheet material has a thickness of 1.0 mm or less.

5. A method for producing a weather strip including a main body portion having end portions and a bonding portion that bonds the opposite end portions of the main body portion to each other, the method comprising:
 preparing a weather strip material for forming the main body portion and a bonding sheet material for forming the bonding portion; and
 cross-linking the bonding sheet material by placing the bonding sheet material between the opposite end portions of the weather strip material, wherein
 the bonding sheet material satisfies all of the following conditions:
  a composition including at least EPDM, a cross-linking agent, and carbon black;
  a volume resistivity of $1.0 \times 10^6$ $\Omega \cdot$cm or more based on a double ring electrode method of JIS-K6271-1: 2015 where a test piece has a thickness of 2 mm;
  when the composition is placed in a mold and molded to press the composition at 50° C. under 100 Kgf/cm$^2$ for 60 seconds whereby a molded article is produced, the molded article has a thickness change rate of 100% or less, the thickness change rate being represented by a formula (1);
  the formula (1): Thickness change rate=((thickness of molded article after 30 minutes from releasing press−thickness of mold)/thickness of mold)×100; and
  when a total amount of the composition configuring the bonding sheet material is defined as 100% by volume, a blending ratio of the carbon black is 11% or more by volume and 19% or less by volume.

6. The production method according to claim 5, wherein
 the preparing includes producing the bonding sheet material by putting the composition into a press mold and molding to press the composition.

7. The production method according to claim 6, wherein
 the preparing includes using the press mold having a thickness of 0.5 mm or more when the mold is closed.

8. The production method according to claim 5, wherein
 the preparing includes preparing the bonding sheet material having a thickness of 1.0 mm or less.

* * * * *